Aug. 7, 1945.  L. B. ALLEN ET AL  2,381,426

FLEXIBLE EXHAUST LINE JOINT

Filed Nov. 18, 1942

Inventors
Leonard B. Allen
William C. Heath

By Lyon & Lyon
Attorneys

Patented Aug. 7, 1945

2,381,426

UNITED STATES PATENT OFFICE 2,381,426

FLEXIBLE EXHAUST LINE JOINT

Leonard B. Allen, San Diego, and William C. Heath, La Mesa, Calif., assignors to Solar Aircraft Company, San Diego, Calif., a corporation of California Application November 18, 1942, Serial No. 466,022

5 Claims. (Cl. 285—91)

This invention relates to flexible joints for use in lines carrying fluids at elevated temperatures, and is particularly useful in exhaust lines of aircraft engines.

The broad object of the invention is to provide a lightweight flexible joint which is capable of operating under elevated temperatures for very long periods without leakage or breakdown resulting from galling, seizing or wear.

Another object is to provide a joint which is relatively inexpensive and can be constructed without the use of highly specialized machinery.

It is frequently necessary in modern airplane design to provide flexible joints in the exhaust manifold to provide for relative movement resulting from engine vibration. Flexible joints of the ball and socket type have been long known in other arts, but when the known structures of this type were applied to the exhaust lines of aircraft engines they were found to have relatively short life because of the extreme temperatures and vibrations encountered. Of recent years numerous designers have created special flexible joint structures, for use on aircraft engines, which are intended to withstand these severe temperature and vibration conditions. However, to the best of our knowledge, none of these recently suggested modifications of the old ball and socket structures has proved satisfactory. The best of them has had to be replaced after approximately 200 hours of service because of wear, leakage, and, in some cases, seizure of the wearing surfaces.

To realize the severity of the service conditions to which these flexible joints are exposed, it must be recognized that they must accommodate vibrations ranging upward from 30 cycles per second, with amplitudes of movement of from .005 to .015 inch. Furthermore, the temperature of the structure ranges from 900° F. up to in some cases 1800° F. When the engine is started on the ground, the exhaust structure heats very rapidly and probably non-uniformly. Conversely, when the aircraft alights on the ground in any temperature from that of the Arctic regions to that of the tropics, the exhaust system structure is abruptly cooled. It is apparent that such violent temperature variations produce relatively large expansions and contractions in the exhaust structures, which are preferably of sheet metal because of weight considerations. In order to properly fulfill their functions, flexible joints must maintain their tightness at all altitudes and temperatures and under all conditions of vibration, and should remain in this condition over long periods of time with practically no maintenance and very infrequent replacement. In addition to the sudden temperature changes which result when the engine is started and stopped, the temperature varies during flight with variations in the power demand on the engine and with variations of temperature and humidity of the air through which the aircraft is traveling.

The prior art structures which appear to be the most successful have utilized ball and socket joints in which either a closeness of fit or an expansible packing ring of solid construction was relied upon to prevent leakage. No such structures have to our knowledge met the life requirements which are desired.

The present invention differs essentially from all prior exhaust line joints of the ball and socket type in employing an equatorial resilient packing between the ball and socket, with cooperating spherical bearing surfaces on the ball and socket in zones on both sides of the packing. The invention also contemplates a particular combination of materials for the ball and socket surfaces, with a special resilient packing. Suitable surfaces are hard chromium plating against stainless steel, and a suitable packing is made of fine wires woven of inconel compacted together, by rolling, into a desired shape.

The manner in which the aforelisted objects, together with other more specific objects and features of the invention, are achieved will now be explained by describing in detail certain preferred embodiments of the invention as illustrated in the drawing, in which, Figure 1 is a side elevation with parts broken away of one embodiment of double ball and socket joint in accordance with the invention;

Figure 1:
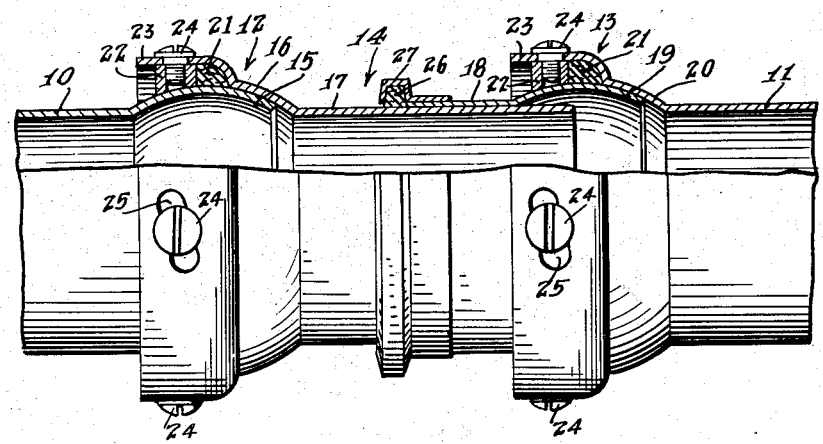

The joint of Fig. 1 is adapted to provide limited freedom of relative movement in all directions between two pipe sections 10 and 11, respectively, by means of two ball and socket joints 12 and 13, respectively, and a telescoping sleeve joint 14.

The joint 12 comprises an internal ball member 15 on the end of the pipe section 10 (preferably formed integrally therewith), and a socket member 16 formed on the end of a sleeve 17 which forms one telescoping member of the telescoping joint 14. The other member of the telescoping joint comprises a sleeve 18 fitting over the sleeve 17 and having formed on its right end the ball member 19 of the joint 13. Ball member 19 cooperates with a socket member 20 formed on the left end of the pipe section 11.

The two joints 12 and 13 are identical in construction, each having its socket member expanded into a bell end for receiving a flexible packing 21 which is maintained in position by an annular ring 22 positioned between the bell end portion 23 of each socket and the associated ball 15 or 19, as the case may be. The rings 22 have cylindrical outer surfaces to fit against the cylindrical inner surfaces of the bell ends 23, while their inner surfaces are spherical to fit against the associated ball. Each ring 22 is held in position by four screws 24 extending through angle slots 25 in the associated bell end 23. These angle slots 25 permit a limited adjustment of the working position of the ring 22 to vary the clearance between the inner surface of the ring and the associated ball and determine the compression of the packing. Furthermore, by removing the screws 24, the rings 22 can be withdrawn for inspection or replacement of the packing 21.

In the joint of Fig. 1 there is also provided a packing 26 to effect a seal between the sleeves 17 and 18. The packing 26 is held in an inwardly facing annular trough 27 secured to the outer sleeve 18 so that the packing 26 extends inwardly past the end of the sleeve 18 into contact with the inner sleeve 17.

The material and finish of the contacting surfaces, together with the packing material, are important features of our invention. We have found that the joint stands up exceptionally well when the sheet metal employed is a stainless steel, the inner surfaces of the sockets are hard chromium plated, the rings 22 are of meehanite containing 22% nickel, and the packing material is made of fine wires woven of inconel and rolled into shape to fit in the spaces provided therefor, as shown in Fig. 1. Furthermore, the hard chromium plated inside surfaces of the socket members 16 and 20 and of the external sleeve 18 should be polished to a mirror surface, and the outer surfaces of the stainless steel ball members 15 and 19 and of the internal sleeve 17 should be polished, at least to that degree known as a "brush polish"—40 micro inches R. M. S.

It has been found preferable to make the overlap between the balls and the sockets from 0.3 to 0.5 of the mean diameter of the balls, and to make the width of the packing contact surface from 0.3 to 0.4 of the total width of overlap.

It is found by experience that the (radial) clearance between the ball and the socket should be between .009 and .021 inch.

The packing 21 appears to have the important function of not only reducing gas leakage at the joint but of providing sufficient permanent frictional resistance between the ball and socket to prevent relative rotation therebetween. Thus it has been found by experiment that in many double ball and socket joints of the type shown in Fig. 1, where there is no flexible packing material such as the packing 21, although the pipe sections 10 and 11 are restrained against rotation by attachment to, say, the engine and an exhaust manifold, respectively, the remainder of the joint, including the socket 16, tubes 17 and 18, and the ball member 19, rotates continuously as a result of the vibration of the engine. It is believed that this unnecessary and undesirable rotation contributes greatly to the wear of the parts and shortens their life. The fact that such free rotation is prevented by the packing 21 in the present instance is believed to contribute substantially to the service life of the joint.

The inconel packing appears to be peculiarly suited for use in flexible joints for airplane exhaust lines. Joints inspected at the end of 300 hours of service show the inconel packing in very good condition, with no apparent loss of elasticity.

Figure 2:
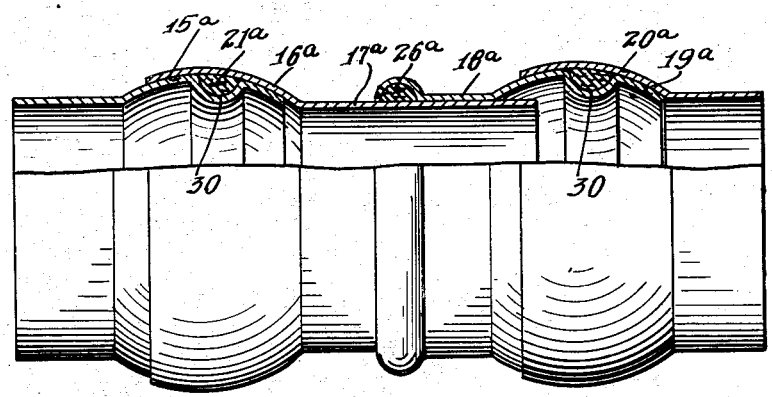
Figure 2 is a view similar to Fig. 1 but showing a modified structure.

The joint structure shown in Fig. 2 differs from that of Fig. 1 in that the construction has been simplified and made lighter in weight, although the packing must be inserted at the time of manufacture. It also differs in detail from the structure of Fig. 1 in that the receptacles for the packing are formed in the ball surfaces instead of the socket surfaces. Thus the ball member 15—a has an annular groove 30 rolled therein, which contains the packing 21—a. Furthermore, the sleeve packing 26—a is held in an annular trough formed in the end portion of the external sleeve member 18—a. In the construction of Fig. 2, the sockets 16—a and 20—a are shaped over the packing 21—a and the associated ball 15—a or 19—a by swaging. In this instance the outer surfaces of the balls 15—a and 19—a are chromium plated and mirror polished and the inner surfaces of the sockets 16—a and 20—a are brush polished.

The trough or groove 30 in the ball 19—a is preferably made of slightly larger internal diameter than the external diameter of the internal sleeve 17—a to permit movement of the sleeve past the groove, if necessary.

Figure 3:
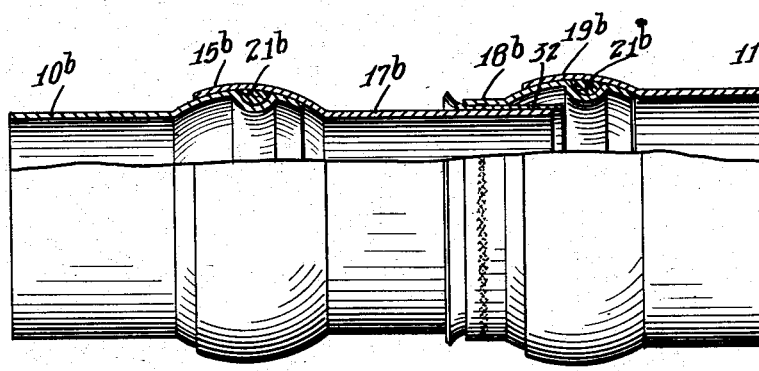
Fig. 3 is a view similar to the view of Fig. 1 but showing still a third modified structure.

The joint structure shown in Fig. 3 is identical with that shown in Fig. 2 except that the inconel packing between the external sleeve 18—b and the internal sleeve 17—b has been eliminated, and a metal rubbing sleeve 32 has been inserted between the two sleeves and welded to the external sleeve 18—b. This construction has been found to be permissible in practice by virtue of the fact that the rubbing sleeve 32 provides a relatively large area of sliding contact with the internal sleeve 17—b. A large portion of the sliding contact occurs within the ball member 19—b, so that the overall length of the joint can be made relatively small. The internal surface of the rubbing sleeve 32 is chromium plated and mirror polished, and works against a brush polished surface on the exterior of the stainless steel sleeve 17—b. The telescoping sleeve portions of the joint of Fig. 3 have been found to have a long life in actual test, and this long life is believed to be due very largely to the fact that the inconel packing 21—b in the associated ball and socket joints prevents the sleeve members from rotating relative to the pipe sections 10—b and 11—b and relative to each other in response to engine vibration.

Compositions of stainless steel that give good results are known in the trade as: type 321 having 18% chromium and 10% nickel; type 321 having 18% chromium and 8% nickel; type 347 having 18% chromium and 10% nickel; type 309S-Ti having 25% chromium and 12% nickel. Other materials that may be employed in place of stainless steel are: inconel; Hastelloy C; K-42-B; and Konal.

As a substitute for chromium as the plating material, there may be employed rhodium or nickel.

As a substitute for inconel packing, there may be employed nickel or alloys of gold and silver, or gold and iridium.

Important characteristics of all the base materials employable are: They do not scale below 1600° F. and are relatively resistant to scaling above that temperature; they have a tensile strength in excess of 45,000 lb./in.$^2$ at 1200° F.

Important characteristics of the plating material are that it wear well at high temperatures and be free from tendency to gall or seize with the cooperating bearing material at high temperatures.

Important characteristics of the packing material are that it be woven from fine wire of a metal or alloy that is oxidation resistant at high temperatures and also relatively harder and more wear resistant than the surface against which it rubs. The wire from which the packing is woven should be from .010 to .025 inch diameter so it is apparent that the metal or alloy employed must have good drawing properties.

For the purpose of explaining the invention, certain specific embodiments thereof have been described in detail, but changes from the exact structure shown will be obvious to those skilled in the art and the invention is to be limited only to the extent set forth in the appended claims.

We claim:

1. A flexible joint for the exhaust line of an internal combustion engine, said joint comprising first and second aligned conduit members having ball end portions at their near ends, first and second sleeve members in telescopic relation with each other and having ball end portions a their remote ends nesting with the ball end portions of said first and second conduit members, each pair of nested members having an annular packing member therebetween at their equator and having spherical bearing surfaces on both sides of their equators, whereby separating movement of each ball portion from its associated nested ball portion in any direction is positively prevented by direct contact between spherical portions of the two nested ball portions, said sleeve members being in free floating relation to said conduit members and having a free sliding fit with each other, one of each pair of nested ball portions having an equatorial groove for holding said annular packing member in rubbing relation with the other ball portion of the pair, and said annular packing member comprising resilient material compressed between the nested ball portions, whereby it functions as a seal and provides frictional resistance to fortuitous rotation of said sleeve members with respect to said conduit members.

2. A joint as described in claim 1 in which the packing member comprises a compact mass including a fine, filamentary, corrosion-resistant metallic material that is harder than the ball portion it rubs against.

3. A joint as described in claim 1 in which the packing member comprises a compact mass including a fine, filamentary, corrosion-resistant metallic material and in which said material and the surface of the grooved ball portion holding the packing are both harder than the nesting ball portion against which the packing rubs.

4. A flexible joint for the exhaust line of an internal combustion engine of an aircraft, comprising a pair of thin sheet conduit members having nested end portions constituting a ball and socket joint, in which the socket member of the joint comprises a first portion of one of said conduit members in the shape of a zone of a sphere, surmounted by a bell end, the outer portion of which is substantially cylindrical, a resilient packing with the inner part of said bell end portion and a filler ring within the cylindrical outer portion of said bell end, said filler ring having an outer cylindrical surface slidably fitting within said cylindrical portion of said bell end and having an inner spherical surface to fit against the outer surface of the ball member of said joint, and means for detachably securing said filler ring in any one of a plurality of longitudinal positions within said bell end, said filler ring and bell end portion together defining an internal equatorial annular groove in the socket member of said joint for containing said packing.

5. A flexible joint for the exhaust line of an internal combustion engine of an aircraft, comprising a pair of thin sheet conduit members having nested end portions constituting a ball and socket joint, in which the socket member of the joint comprises a first portion of one of said conduit members in the shape of a zone of a sphere, surmounted by a bell end, the outer portion of which is substantially cylindrical, a resilient packing within the inner part of said bell end portion and a filler ring within the cylindrical outer portion of said bell end, said filler ring having an outer cylindrical surface slidably fitting within said cylindrical portion of said bell end and having an inner spherical surface to fit against the outer surface of the ball member of said joint, and means for detachably securing said filler ring in any one of a plurality of longitudinal positions within said bell end, said filler ring and bell end portion together defining an internal equatorial annular groove in the socket member of said joint for containing said packing, said means for detachably securing said filler ring comprising slots in the cylindrical portion of said bell end, and screw means extending through said slots for clamping said ring to said bell end in any one of a plurality of longitudinal positions for adjustment of the fit between the ball and socket members.

LEONARD B. ALLEN.
WILLIAM C. HEATH.